United States Patent [19]

Kelly, Jr.

[11] Patent Number: 4,480,702
[45] Date of Patent: Nov. 6, 1984

[54] METHOD AND APPARATUS FOR DRILLING OIL WELL AND TREATING DRILLING MUD

[75] Inventor: John Kelly, Jr., Arlington, Tex.

[73] Assignee: Mobil Oil Corporation, New York, N.Y.

[21] Appl. No.: 508,767

[22] Filed: Jun. 29, 1983

Related U.S. Application Data

[63] Continuation of Ser. No. 329,772, Dec. 11, 1981, abandoned.

[51] Int. Cl.$^3$ .............................................. E21B 21/06
[52] U.S. Cl. ...................................... 175/66; 175/206; 264/109; 264/117; 264/141; 425/217; 425/376 R
[58] Field of Search ......................... 134/6, 7, 18, 25.1, 134/40, 43; 175/66, 206, 207; 264/109, 117, 141; 425/217, 376 R

[56] References Cited

U.S. PATENT DOCUMENTS

| | | |
|---|---|---|
| 2,464,204 | 3/1949 | Baker . |
| 2,601,862 | 7/1952 | Thomson ................................ 134/7 |
| 2,919,898 | 1/1960 | Marwill et al. ...................... 175/217 |
| 3,017,342 | 1/1962 | Bulat et al. .......................... 134/25.1 |
| 3,688,781 | 9/1972 | Talley ................................. 134/56 R |
| 3,693,733 | 9/1972 | Teague ................................ 175/206 |
| 3,748,103 | 7/1973 | Bean et al. .......................... 264/117 |
| 4,209,381 | 6/1980 | Kelly ..................................... 175/66 |
| 4,222,988 | 9/1980 | Horst ..................................... 175/66 |
| 4,343,751 | 8/1982 | Kumar ................................. 264/117 |

Primary Examiner—Willard E. Hoag
Attorney, Agent, or Firm—A. J. McKillop; Michael G. Gilman; George W. Hager, Jr.

[57] ABSTRACT

A system for treating oil-contaminated drill cuttings includes a grinder for increasing the surface area of the drill cuttings to enhance the absorption of free oil on the cuttings. A mixer enhances the absorption of free oil into the additional solid, oil-absorbent material exposed through the increased surface area of the ground cuttings. After mixing, the ground cuttings may be compacted into individual masses of sufficient density to sink in water. Fine materials are separated from said compacted masses prior to disposal in a marine environment.

8 Claims, 2 Drawing Figures

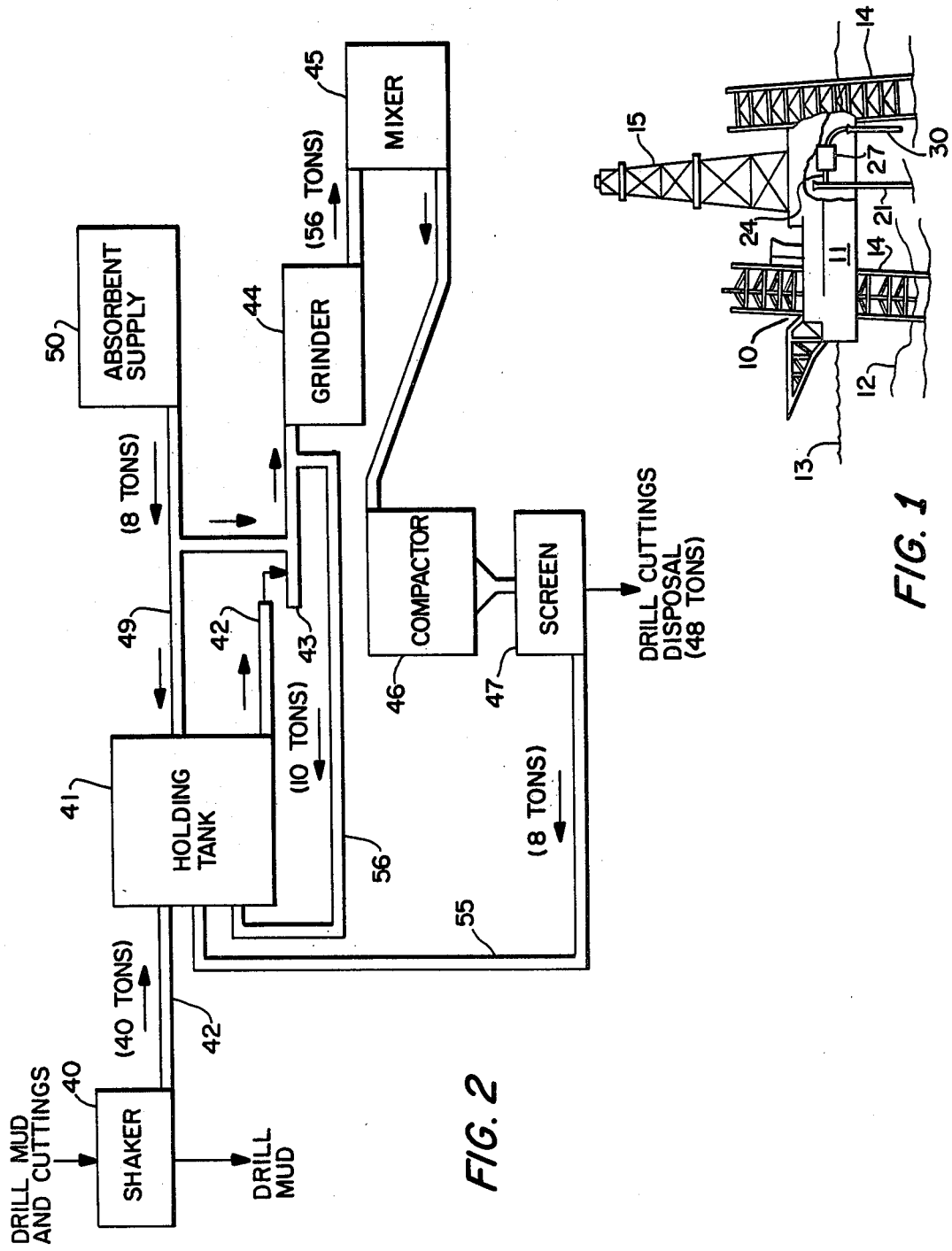

METHOD AND APPARATUS FOR DRILLING OIL WELL AND TREATING DRILLING MUD

This is a continuation of copending application Ser. No. 329,772, filed Dec. 11, 1981, abandoned.

The present invention relates to an onsite system for treating oil-contaminated drill cuttings before disposal and more particularly relates to a method for treating such drill cuttings so that the treated cuttings can be disposed of without ecological risk.

In a rotary drilling operation, a fluid commonly called "mud" is circulated from a storage area on the surface, downward through the drill pipe, out openings in the drill bit, and upward within the borehole to the surface. This return mud carries with it the drill cuttings from the bottom of the borehole. The returning mud along with its entrained drill cuttings is passed onto a "shale shaker" before it is returned to the storage area. The shaker, which normally sits above the mud storage area, is essentially a screen that is used to separate the drill cuttings and cavings from the mud. The mud falls by gravity through the screen and the cuttings pass over the end of the screen.

Disposal of these separated cuttings is sometimes a real problem. When a drilling mud system such as an oil-base mud is used which coats the cuttings with undesirable contaminants, e.g., oil, the cuttings cannot be disposed of directly without the risk of polluting the area around the drilling site. Although the disposal of contaminated drill cuttings is complicated at an offshore location, it may also be a major problem at onshore locations where ecological considerations prevent the normal disposal of untreated cuttings.

There are two general techniques for treating these contaminated cuttings to make them ecologically acceptable. Either they must be transported to disposal facilities or they must be treated on site to remove the contaminants before disposal. The added expense involved in transporting the cuttings from an offshore drill site is substantial, and accordingly, seriously detracts from widespread commercial application of this technique. Further, the technique of transporting the cuttings to shore for disposal may be impractical in areas of bad weather and rough seas. Therefore, for obvious reasons, it is much preferred to treat and dispose of the drill cuttings, especially for offshore operations, directly at the drilling site.

To treat contaminated cuttings onsite, different types of methods have been proposed. One approach is to burn oil off the cuttings with high intensity lamps. However, this approach presents problems (i.e., possible fire hazards due to the lamps and the difficulty of equally exposing all the cuttings to the lamps) which makes it unfeasible in most instances.

Another approach involves washing the cuttings with a detergent to remove the contaminants, separating the washing solution and contaminants, and dumping the clean cuttings into the water. One example of this approach is disclosed in U.S. Pat. No. 3,688,781 to William A. Talley, Jr.

In a further approach as set forth in U.S. Pat. No. 4,209,381 to John Kelly, Jr., the contaminated cuttings are separated from the drilling mud and passed to a heating unit where they are sprayed with steam to flash distill the oil from the cuttings. The distilled oil and the spent steam are passed to a cooling unit where they are condensed before being passed to a water-oil separator.

In a yet further approach, as set forth in U.S. Pat. No. 4,242,146 to John Kelly, Jr., the drill cuttings are sufficiently ground and mixed so that the contaminated oil is absorbed into the additional solid, oil-absorbent material of the cuttings themselves as exposed through the grinding. The ground and mixed cuttings are then compacted into pellets or briquettes before disposal to insure that the cuttings will safely sink to the bottom of the water into which they are disposed.

BRIEF DESCRIPTION OF THE DRAWINGS

FIG. 1 is a perspective view, partly in section, of an offshore drilling platform incorporating the present invention.

FIG. 2 is a schematic of the drill cutting treating unit of FIG. 1 in accordance with the present invention.

SUMMARY OF THE INVENTION

The present invention is directed to a system for treating oil-contaminated drill cuttings from a well drilling operation in which a drilling fluid is circulated to remove drill cuttings from the well being drilled. A shaker separates the drill cuttings from the drilling mud. A holding tank collects the separated drill cuttings. A grinder increases the surface area of the drill cuttings to expose additional solid oil-absorbent material. A mixer enhances the absorption of free oil into the additional solid, oil-absorbent material exposed through the increased surface area of the ground cuttings.

In a further aspect, a controlled amount of additional solid oil-absorbent material is added to the holding tank and a stirring member within the holding tank blends the drill cuttings with the added solid oil-absorbent material. A conveyor transports the blended drill cuttings to the grinder. A portion of the blended drill cuttings is diverted back into the holding tank to enhance the blending process. The rate of flow of the blended drill cuttings from the holding tank to the grinder is controlled so that the rate of disposal of the drill cuttings is no less than the sum of the rate at which the drill cuttings are being produced plus the rate at which the oil-absorbent material is being added.

In a still further aspect, the conveyor between the holding tank and grinder is a blending conveyor. Additional solid, oil-absorbent material may be added to the blending conveyor, whereby the drill cuttings are blended with the added solid, oil-absorbent material as they are being transported from the holding tank to the grinder.

In a yet further aspect, a compactor presses the ground cuttings into individual masses having sufficient density to sink in water. A screen separates from the compacted cuttings the fine materials which do not have the desired quality for disposal into the water. The fine materials separated from the compacted drill cuttings are recycled through at least some portion of the treating system.

DESCRIPTION OF THE PREFERRED EMBODIMENT

Referring to FIG. 1, there will be described a well drilling operation with which the treating system of the present invention may be utilized. A typical offshore drilling rig 10 has a platform 11 supported on marine bottom 12 of the body of water 13 by means of legs 14. A derrick 15 is mounted on platform 11 which is used to carry out normal rotary drilling operations. Although a fixed offshore platform is shown for illustrative purposes, it should be realized that the present invention can be used equally as well with other offshore drilling operations, e.g., floating drilling vessels or submergible barge platforms, as well as with onshore drilling operations.

In rotary drilling operations, a fluid, commonly mud, is circulated into and out of the hole being drilled for a number of reasons, one being to carry drill cuttings out of the borehole. A typical, well known mud circulation system for a rotary drilling operation is partially illustrated in FIG. 1. A conductor pipe 21 extends from platform 11 into marine bottom 12. Mud is circulated down a drill string (not shown) which is positioned in and extends through conductor pipe 21. The mud exits from the drill pipe through openings in a drill bit (not shown) on the lower end of the drill pipe and flows upward through conductor pipe 21 to mud return line 24. The mud carries drill cuttings with it back to the surface. As is well known in the art, the mud exits mud return line 24 and flows through shale shakers, desanders, desilters, hydrocyclones, centrifuges, and/or other known devices of a treating unit 27 to separate the cuttings from the mud. The mud is then returned to a storage area (not shown) for reuse.

Where the mud being used does not coat the cuttings with any undesirable contaminants, the cuttings are sometimes returned directly to the body of water 13 or are disposed of in some other manner. However, as is often the case, a special mud system has to be employed in certain drilling operations, both offshore and onshore, which coats the cuttings with contaminants. This presents serious problems in disposing of the cuttings. For example, in offshore operations, the contaminants may wash free when the cuttings are returned to the water, thereby causing undesirable pollution problems. An example of such a mud system is one commonly called an "oil-base" mud system. The mud used in this system coats the cuttings with oil which remains adhered thereto even after the cuttings are mechanically separated from the mud. If these cuttings are returned untreated to the water, some of the oil most likely will wash off and may form an oil slick on the water. Also, in some instances, the cuttings, after separation, are "washed" with diesel or other suitable oil to remove whole mud and other chemical contaminants therefrom. However, some of the diesel or other oil is likely to adhere to the cuttings which complicates their disposal.

The contaminated cuttings, after being separated from the mud by the treating unit 27, may be further treated with one or more of the techniques set forth and described in the aforementioned U.S. Pat. Nos. 3,688,781; 4,209,381; and 4,242,146. It may be particularly desirable, as a final step in the treating process, to compact the mixture of cuttings into pellets or briquettes of sufficient density to sink in water as described in U.S. Pat. No. 4,242,146. Any of several known, commercially available compactors which compact a solid mixture and extrude the mixture as pellets or briquettes, may be employed, one such compactor being the K-G Briquetting System sold by Komarek-Greaves and Co., Rosemont, Ill.

The treated, and preferably compacted cuttings, pass to the discharge member 30 for conveying the treated and compacted cuttings from the drill platform to the ocean. It is a specific feature of the present invention to provide for a discharge member which allows the cuttings to enter the water without being broken up or disintegrated from impact or other contact with the discharge member itself, the drill platform, the platform support legs and pilings, or the water itself. In this manner the cuttings can be disposed of in the ocean with minimum pollution to the area around the drilling site with oil from the cuttings.

The discharge member 30 may be a vertical member for disposing of the cuttings directly downward beside the drill platform or may be inclined from the vertical along some portion of its pathway so as to carrying the cuttings away from the drill platform. By disposing of the cuttings at some distance from the platform, the possibility of break-up of the cuttings upon impact with the platform or the pilings around the base of the platform is eliminated.

Having described a well drilling operation in conjunction with FIG. 1, with which the present invention may be utilized, reference may now be made to FIG. 2 illustrating the treating system for oil-contaminated drill cuttings of the present invention.

Referring now to FIG. 2, the oil-contaminated drill cuttings from the well drilling operation pass through the mud return line to one or more of a plurality of shakers 40. These shakers permit the mud fluid to pass through the shaker screens while leaving the drill cuttings on top of the screen. The cuttings are conveyed from the shakers 40 to a holding tank 41 by means of a suitable conveyor 42 such as, for example, a screw feed conveyor for providing some blending of the drill cuttings during transport. Such drill cuttings may comprise either sandy material or shale material, or both. The tank 41 may preferably include a stirring member for mixing and blending any sandy material present with any shale material present. The tank 41 further serves to distribute the drill cuttings at a uniform rate to the rest of the treating system even though the production rate of the drill cuttings increases or decreases with time depending upon the well drilling operation.

From tank 41, the drill cuttings travel by means of a further blending conveyor 43 to a grinder, or crusher. This grinder breaks up the drill cuttings into smaller particles to provide an increased surface area for the further absorption of the contaminating free oil on the cuttings.

From the grinder 44, the cuttings pass to a mixer-muller 45 which provides for further mixing of the cuttings to cause absorption of any of the free oil into the cuttings which was not absorbed during the mixing that is inherent in the grinding process. Mixer-muller 45 can also provide for additional grinding if yet additional surface area is required for further absorption of the free oil present.

From the mixer-muller 45, the drill cuttings are transported to the compactor 46 which compacts the cuttings and extrudes them as pellets or briquettes. The pellets or briquettes then pass over a screen 47 which serves to separate out those pellets, briquettes, or other fine material having insufficient size to sink in water at a rapid enough rate to prevent their carriage away from the area surrounding the drill platform by ocean currents, those fine materials being recycled through the treating system.

Having described the flow of the oil-contaminated drill cuttings through the various components of the treating system, the operation of the system will now be described in more detail with respect to the flow rate through the system and the addition of any absorbent or surfactant materials for aiding in the free oil absorption process.

During drilling operation, if there is sufficient shale in the drill cuttings, the grinding process will provide enough additional solid absorbent surface area to absorb the free oil contaminating the drill cuttings. However, if there is too much sand present in the drill cuttings, the pellets or briquettes from the compacting process will be too sandy, or too wet, and will not hold together on the final screening step or upon impact with the water. In this event, a solid absorbent material such as a clay, for example, is blended with the drill cuttings so that the grinder 44 and mixer-muller 45 will provide drill cuttings of sufficient composition and dryness to allow the compactor to produce pellets or briquettes that will not break up or disintegrate. This absorbent material may be added and blended with the drill cuttings in the holding tank 41 and also in the blending conveyor 43. A metering conveyor 49 can be activated to supply a desired rate of absorbent material flow from an absorbent supply 50 into the holding tank 41 and a metering conveyor 51 can be activated to supply a desired rate of absorbent flow from absorbent supply 50 to the blending conveyor 43.

Referring again to the discharge of the drill cuttings into the water, the compacted drill cuttings need to be of sufficient composition to resist break-up and disintegration and also to have sufficient densities to sink to the water bottom. It is therefore important that any fine material exiting from the compactor 46 along with the desired pellets and briquettes, be separated and recycled through at least a portion of the treating system and reprocessed so that they will not contaminate the water surrounding the drill platform. The screen 47 may selectively pass to discharge only those pellets or briquettes of one-quarter to one-half inch in size, for example. A conveyor 55 carries these separated fine materials preferably back to the holding tank 41 where they may be recycled through the entire treating system. However, it is apparent that such recycling could be designed to carry the fine materials back to any portion of the system as desired, even to the extent of recycling just through the compactor 46.

Having now described the flow of the drill cuttings, absorbent material and fine material through the treating system, the rate at which such cuttings and materials flow through the system will be described. An important aspect of the invention is to be able to discharge treated drill cuttings from the system at the same rate, or faster, than the rate at which the oil-contaminated drill cuttings are being drilled. Otherwise, storage would have to be provided for the untreated cuttings, which could be quite a problem on an offshore drill platform.

In one embodiment, the treating system is designed to process up to 40 tons of drill cuttings per hour. Referring again to FIG. 2, up to 40 tons of drill cuttings per hour can pass from the shaker 40 into the holding tank 41. Also entering the holding tank 41 is the fine material from the screen 47 which, in this embodiment, is about 8 tons per hour. From the absorbent supply 50 up to 8 tons per hour of absorbent material can be metered into the holding tank 41 or onto the blending conveyor 43 as needed. From the blending conveyor 43 up to 10 tons per hour of mixed drill cuttings, absorbent material and fine material can be recycled by means of conveyor 56 back into holding tank 41 to further aid in the mixing or blending within the holding tank. Therefore, 56 tons of the blended drill cuttings per hour will be processed through the grinder 44, mixer-muller 45, compactor 46 and screen 47. Since the screen 47 will separate out each hour the previously mentioned 8 tons of fine materials, 48 tons per hour of treated drill cuttings are disposed into the water. This 48 ton per hour discharge rate of treated drill cuttings corresponds to the total input rate to the system of 40 tons per hour of drill cuttings and 8 tons per hour of added absorbent material.

Again, the important feature is to be able to treat and dispose of the drill cuttings at the rate at which they are being produced. However, fluctuations in the drilling rate can be temporarily handled within the holding tank 41. Ideally the holding tank will be filled to about 20 to 30 percent capacity. Should the drilling rate decrease such that, in the particular embodiment described herein, less than 40 tons per hour of drill cuttings are being produced, the level of the holding tank will lower and the treating system can be turned off until the level again rises. Should the drilling rate, again in the particular embodiment herein, exceed 40 tons per hour of drill cuttings, the level within the holding tank will rise. In the event the holding tank begins to reach its capacity and the drilling rate does not decrease, a separate storage facility would have to be made available, or preferably, a separate and parallel treating system would have to be available on the drill platform for activation to handle the overload of drill cuttings, otherwise the drilling would have to be shut down until the level in the holding tank reaches a level whereby drilling could be resumed.

As can be seen from the foregoing, the present invention provides a safe, reliable system for treating oil-contaminated drill cuttings from drilling operations. While a particular embodiment for the system has been described above, many modifications and variations may be made without departing from the spirit and scope of the invention as set forth in the appended claims.

I claim:

1. A method for drilling a well at an offshore location, comprising the steps of:
    (a) drilling an offshore well through a subsurface formation which is substantially free of sand,
    (b) circulating an oil base drilling fluid through the drilled well to remove the sand-free formation drill cuttings,
    (c) separating the drilling fluid from the sand-free drill cuttings,
    (d) grinding the sand-free drill cuttings to increase the surface area of said sand-free drill cuttings,
    (e) mixing the ground sand-free drill cuttings free from otherwise-added oil absorbent material to enhance the absorption of the free oil adhering to said cuttings into the increased surface area of said cuttings
    (f) compacting the mixed and ground cuttings, and
    (g) disposing of the compacted cuttings at sea.

2. The well drilling method of claim 1 further including the steps of:
    (a) separating out those of said compacted drill cuttings having insufficient size to provide a density sufficient for said compacted drill cuttings to sink in water at a rate to prevent their being carried away by ocean currents, and
    (b) recycling said separated and compacted drill cuttings through said grinding, mixing and compacting steps.

3. Apparatus for treating oil-contaminated drill cuttings from a well drilling operation through a subsurface formation which is substantially free of sand and in which a drilling fluid is circulated to remove the sand-free drill cuttings from the well being drilled, comprising:
(a) a shaker for separating the sand-free drill cuttings from the drilling mud,
(b) a grinder for increasing the surface area of said separated sand-free drill cuttings to thereby expose additional solid, oil-absorbent material, and
(c) a mixer for enhancing the absorption of free oil into the additional solid, oil absorbent material exposed through the increased surface area of said ground sand-free drill cuttings,
(d) means for compacting the mixed cuttings, and
(e) means for disposing the compacted cuttings at sea.

4. The system of claim 3 further including means for compacting said ground sand-free drill cuttings into individual masses having sufficient density to sink in water.

5. The system of claim 3 further including a screen for separating out those of the compacted drill cuttings having insufficient size to provide a density sufficient for said compacted drill cuttings to sink in water at a rate to prevent their being carried away by ocean currents.

6. The system of claim 5 further including means for recycling said separated compacted drill cuttings through said grinder, said mixer, and said compacting means.

7. The system of claim 5 wherein said screen separates out those of said compacted drill cuttings of less than one-half inch in size.

8. The system of claim 5 wherein said screen separates out those of said compacted drill cuttings of less than one-quarter inch in size.

* * * * *